United States Patent [19]
Sakai et al.

[11] Patent Number: 5,674,301
[45] Date of Patent: Oct. 7, 1997

[54] HYDROGEN PREPARING APPARATUS

[75] Inventors: Osamu Sakai, Nagoya; Tomonori Takahashi, Chita, both of Japan

[73] Assignee: NGK Insulators, Ltd., Nagoya, Japan

[21] Appl. No.: 447,844

[22] Filed: May 23, 1995

[30] Foreign Application Priority Data

May 23, 1994 [JP] Japan .................................. 6-108624
Jun. 22, 1994 [JP] Japan .................................. 6-140341

[51] Int. Cl.$^6$ ...................................................... B01J 7/00
[52] U.S. Cl. ........................... 48/61; 48/127.9; 48/DIG. 5
[58] Field of Search ......................... 48/61, 127.9, 198.2, 48/198.3, 198.8, DIG. 5; 423/652

[56] References Cited

U.S. PATENT DOCUMENTS

| | | | |
|---|---|---|---|
| 3,849,076 | 11/1974 | Gryaznov et al. | 48/DIG. 5 |
| 5,326,550 | 7/1994 | Adris et al. | 48/DIG. 5 |

FOREIGN PATENT DOCUMENTS

| | | |
|---|---|---|
| 62-105901 A | 5/1987 | Japan . |
| 63-295402 A | 12/1988 | Japan . |
| 6-40701 A | 2/1994 | Japan . |

*Primary Examiner*—Timothy McMahon
*Attorney, Agent, or Firm*—Kubovcik & Kubovcik

[57] ABSTRACT

A hydrogen preparing apparatus is disclosed which reforms a hydrocarbon and/or a hydrocarbon containing an oxygen atom to obtain a hydrogen-containing gas and separates hydrogen from this hydrogen-containing gas. The apparatus includes a porous substrate and a hydrogen separating film which is formed on a predetermined surface portion of the porous substrate and which selectively separates hydrogen, a reforming catalyst for reforming the hydrocarbon being supported in the pores of the porous substrate. A reforming catalyst for reforming the hydrocarbon is supported on a honeycomb carrier, and the hydrogen separating film is arranged on the downstream side of the honeycomb carrier. The surface area of the catalyst per unit volume of the apparatus can be increased, whereby the apparatus can be miniaturized. A hydrogen separating efficiency can also be improved. The hydrogen manufacturing apparatus can be prevented from being damaged by a difference of expansion between the porous substrate and the container.

4 Claims, 5 Drawing Sheets

HYDROGEN PREPARING APPARATUS

BACKGROUND OF THE INVENTION (i) Field of the Invention

The present invention relates to a hydrogen preparing apparatus in which a hydrogen-containing gas can be produced by reforming a hydrocarbon and/or a hydrocarbon containing an oxygen atom such as methane, propane, methanol, ethanol or petroleum with steam or the like, and hydrogen alone can be selectively and efficiently separated from the produced hydrogen-containing gas.

(ii) Description of the Related Art

In a hydrogen preparing apparatus utilizing a steam reforming reaction, hydrogen, carbon monoxide and carbon dioxide are produced from a material gas comprising a hydrocarbon such as methane or methanol by the use of a reforming catalyst:
(In the case of methanol)

$$CH_3OH + H_2O \rightarrow CO_2 + 3H_2 \tag{1}$$

$$CH_3OH \rightarrow CO + 2H_2 \tag{2}$$

Furthermore, if necessary, hydrogen is separated from this produced gas.

The above-mentioned reforming reaction is an endothermic reaction, and so the higher the reaction temperature is, the more smoothly the reaction proceeds. However, under the high temperature conditions, a hydrocarbon such as methane, methanol, or carbon monoxide cracks to deposit carbon, so that the catalytic activity of the reforming catalyst deteriorates inconveniently. As a technique for preventing this carbon deposition, there has been used a method in which the reaction is carried out by feeding a large amount of steam, but in this case, additional heat is uneconomically required to generate the steam.

Heretofore, in order to solve these problems, a hydrogen separating type steam reforming reactor, in which the hydrogen separation and the reforming reaction are combined, has been suggested for the purposes of lowering the reaction temperature and advancing the reaction (e.g., Japanese Patent Application Laid-open No. 40701/1994).

This reactor contains hydrogen separating films for selectively separating hydrogen in a steam reforming reaction catalyst layer, and in the reaction, hydrogen generated by the reforming reaction is successively separated from the reaction system by the hydrogen separating films, whereby the reaction can proceed even at a low temperature.

Such a hydrogen separating type reforming reactor can produce high-purity hydrogen, and so it is considered that this type of reactor is applied to a fuel battery. Particularly in a phosphate type or a solid polymeric type fuel battery, Pt which is an electrode catalyst is poisoned with a trace amount of CO, and in the solid polymeric type fuel battery, Pt is poisoned, even if the concentration of CO is as low as 10 ppm. Therefore, it is necessary to remove CO from the reformed gas. Hence, the application of the above-mentioned reactor capable of producing high-purity hydrogen is preferable.

However, the reforming catalyst which can be used in the above-mentioned hydrogen separating type reforming reactor is usually in the state of spherical or pelletlike grains, and therefore in order to obtain the surface area of the catalyst necessary for the reforming, a large amount of the catalyst is required to be filled, which leads to the enlargement of the apparatus. Since the large amount of the catalyst is filled, a distance between a catalyst layer and the hydrogen separating film is prolonged, so that it is difficult to separate hydrogen which is present apart from the hydrogen separating film and the very long reactor is required (Japanese Patent Application Laid-open No. 295402/1988). If the spherical or pelletlike catalyst is ground and filled, the structure of the catalyst becomes irregular, so that the filling density becomes nonuniform, with the result that sufficient catalytic characteristics cannot be obtained (Japanese Patent Application Laid-open No. 10590/1987).

Furthermore, when such a hydrogen separating type reforming reactor is exposed to such conditions as to suffer vibration, for example, when the reactor is mounted on an electromobile as a hydrogen fuel preparing apparatus for the electromobile having a fuel battery system, the catalyst breaks and the filling state of the catalyst changes sometimes by the vibration, so that the efficiency of the catalyst deteriorates inconveniently.

SUMMARY OF THE INVENTION

The present inventors have intensively investigated a technique of supporting a catalyst and a technique of forming hydrogen separating films with the intention of solving the above-mentioned conventional problems, and as a result, it has been found that when a catalyst is supported in the pores of a porous substrate or on the surface of a honeycomb carrier, the surface area of the catalyst per unit volume of a reactor can be increased, whereby the reactor can be miniaturized to reduce the weight of the reactor. In addition, it has been found that the employment of the porous substrate or the honeycomb carrier can prevent the catalyst from being broken by vibration, whereby a hydrogen preparing apparatus which can be mounted on a car can be obtained. In consequence, the present invention has been attained.

According to the present invention, there can be provided a hydrogen preparing apparatus which reforms a hydrocarbon and/or a hydrocarbon containing an oxygen atom to obtain a hydrogen-containing gas and separates hydrogen from this hydrogen-containing gas, the apparatus comprising a porous substrate, a hydrogen separating film which is formed on a predetermined surface portion of the porous substrate and which selectively separates hydrogen, and a reforming catalyst for reforming the hydrocarbon, supported in the pores of the porous substrate.

In the above-mentioned hydrogen preparing apparatus, the porous substrate is preferably supported in an overhung state in a container having an inlet for a material gas comprising a hydrocarbon and/or a hydrocarbon containing an oxygen atom, an outlet for separated hydrogen and another outlet for a gas from which hydrogen has been separated.

Furthermore, the outlet for a gas from which hydrogen has been separated is preferably arranged on the opposite side of the inlet for the material gas, and a space between the outer water of the porous substrate and the inner wall of the container is preferably set to 0.1 to 10 mm to enhance the diffusion efficiency of the material gas into the porous substrate.

Moreover, according to the present invention, there can be provided a hydrogen preparing apparatus which reforms a hydrocarbon and/or a hydrocarbon containing an oxygen atom to obtain a hydrogen-containing gas and separates hydrogen from this hydrogen-containing gas, the apparatus comprising a hydrocarbon reforming means in which a reforming catalyst for reforming the hydrocarbon is supported on a honeycomb carrier, and a hydrogen separating means arranged on the downstream side of the hydrocarbon reforming means, comprising a porous substrate and a hydrogen separating film which is formed on a predetermined surface portion of the porous substrate and which selectively separates hydrogen.

In the above-mentioned hydrogen preparing apparatus, the hydrogen separating means is preferably supported in an overhung state in a container having an inlet for a hydrocarbon and/or a hydrocarbon containing an oxygen atom, an outlet for separated hydrogen and another outlet for a gas from which hydrogen has been separated. In addition, the hydrogen preparing apparatus is suitably equipped with a cushion means for absorbing the expansion of the hydrogen separating means.

In the present invention, the reforming catalyst is supported in the pores of the porous substrate or on the honeycomb carrier, and therefore the surface area of the catalyst per unit volume of the apparatus can be increased, whereby the necessary volume of a reaction apparatus can be minimized. Moreover, the porous substrate can be formed into a monolithic structure having through-holes, and the hydrogen separating films can be formed on the inner surfaces of the through-holes which extend through the porous substrate, whereby the area of the hydrogen separating films per unit area of the porous substrate can be increased. The above-mentioned monolithic structure means an integral structure in which a plurality of the through-holes are provided through the porous substrate. In the present invention, even when the reforming catalyst is supported in the pores of the porous substrate, its porosity can be maintained, and thus, needless to say, a gas can pass through the porous substrate.

In addition, in the hydrogen preparing apparatus of the present invention, the porous substrate or the honeycomb carrier can be used, whereby the breakage of the catalyst by vibration can be prevented. In consequence, the apparatus can be mounted on a car or the like and can suitably be combined with a fuel battery. In the case that the hydrogen preparing apparatus is applied to the car, methanol or ethanol is preferable as the hydrocarbon which is the fuel to be reformed, because this kind of hydrocarbon is suitable for storage and transport. In order to lower the reforming temperature, methanol is preferable. Moreover, as the fuel battery, there can be used the phosphate type and the solid polymeric type fuel batteries, but the solid polymeric type fuel battery is more preferable, because its operation temperature is as low as 100° C. or less and it is small-sized and lightweight.

DETAILED DESCRIPTION OF THE INVENTION

Next, the present invention will be described in more detail with reference to embodiments on the basis of the attached drawings, but the scope of the present invention should not be limited to these embodiments.

Figure 1:
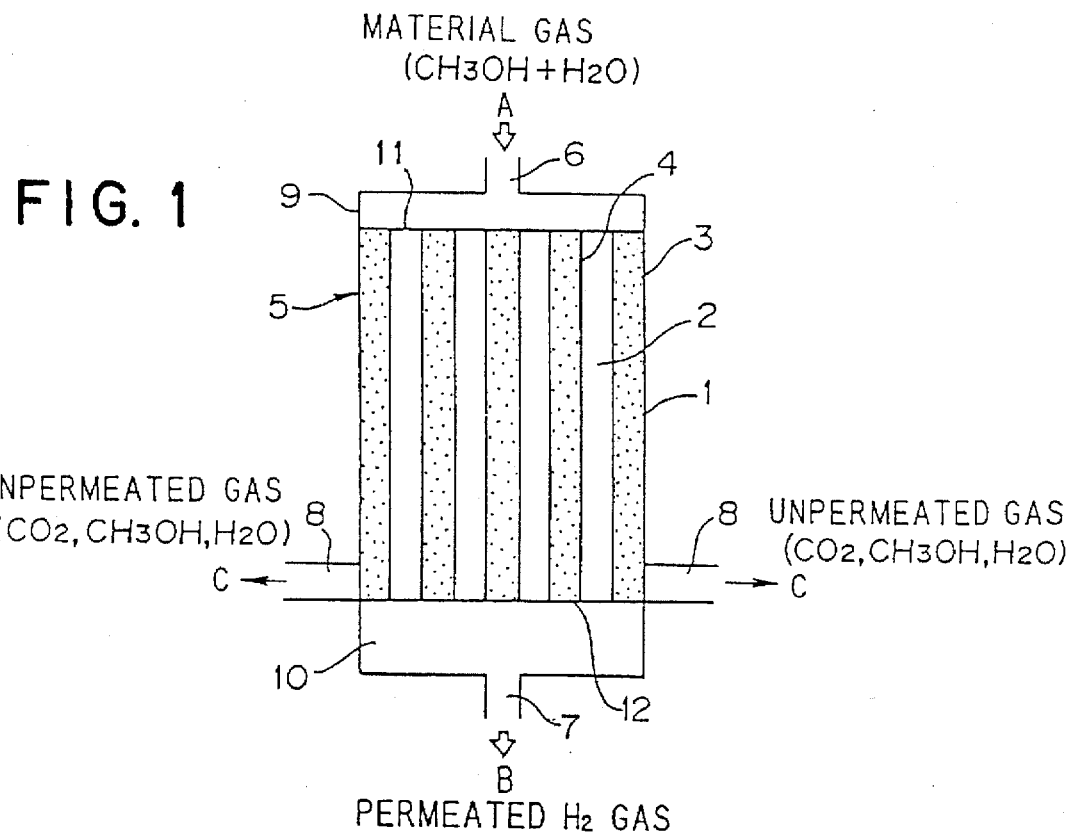
FIG. 1 is a schematic view showing one embodiment of a hydrogen preparing apparatus regarding the present invention.

FIG. 1 is a schematic view showing one embodiment of the hydrogen preparing apparatus of the present invention. 10 Reference numeral 1 is a wholly cylindrical porous substrate, and this substrate 1 is in the state of a monolithic structure in which a plurality of cylindrical through-holes 2 are formed. In the pores of the substrate 1, a steam reforming catalyst of Cu or the like for the hydrocarbon is supported, thereby forming reforming catalyst layers 3. The diameter of the pores in this substrate 1 is required to be suitably controlled in consideration of the catalytic area and the porosity. On the inner surfaces of the cylindrical through-holes 2, hydrogen separating films 4 of Pd or a Pd—Ag alloy are formed. The hydrogen permeability of the hydrogen separating films 4 is inversely proportional to the thickness of these films, and so the hydrogen separating films are preferably as thin as possible. Specifically, the thickness of these films is suitably in the range of 1 to 20 μm. The hydrogen separating films 4 can be formed by a chemical plating method or a gaseous phase method, but on the inner surfaces of the through-holes 2, fine pore layers having a pore diameter of 0.01 to 0.5 μm, preferably 0.05 to 0.2 μm are formed in compliance with the formation conditions of the hydrogen separating films.

The porous substrate 1 is received in a container 5 to manufacture the hydrogen preparing apparatus.

Reference numeral 6 is an inlet for a material gas of methanol and steam, numeral 7 is an outlet for a permeated hydrogen gas, and 8 is an outlet for an unpermeated gas. Furthermore, reference numerals 9 and 10 are flanges, which can be made of a dense material such as a ceramic or a metal. End surfaces 11 of the cylindrical through-holes 2 on the side of the inlet 6 for the material gas and end surfaces 12 of the porous substrate 1 on the side of the outlet 7 for the permeated hydrogen gas are airtightly sealed with a sealant such as a glass or a brazing material.

In the hydrogen preparing apparatus, the material gas A of methanol and steam is introduced into the apparatus through the material gas inlet 6, and then fed to the reforming catalyst layers 3 of the porous substrate 1 through the flange 9. On the reforming catalyst layers 3, a reaction gas comprising hydrogen, carbon monoxide and carbon dioxide is generated by the above-mentioned reforming reaction. Of the reaction gas produced on the reforming catalyst layers 3, a predetermined amount of a hydrogen gas alone permeates through the hydrogen separating films 4 formed on the inner surfaces of the cylindrical through-holes 2 (a permeated hydrogen gas B), whereby the hydrogen gas can be separated from the reaction gas, and the hydrogen gas is then discharged from the apparatus through the flange 10 and the outlet 7. Furthermore, of the mixed gas of the reaction gas and an unreacted gas, an unpermeated gas C which has not permeated through the hydrogen separating films 4 is discharged from the apparatus through the outlet 8 for the unpermeated gas.

Figure 2:
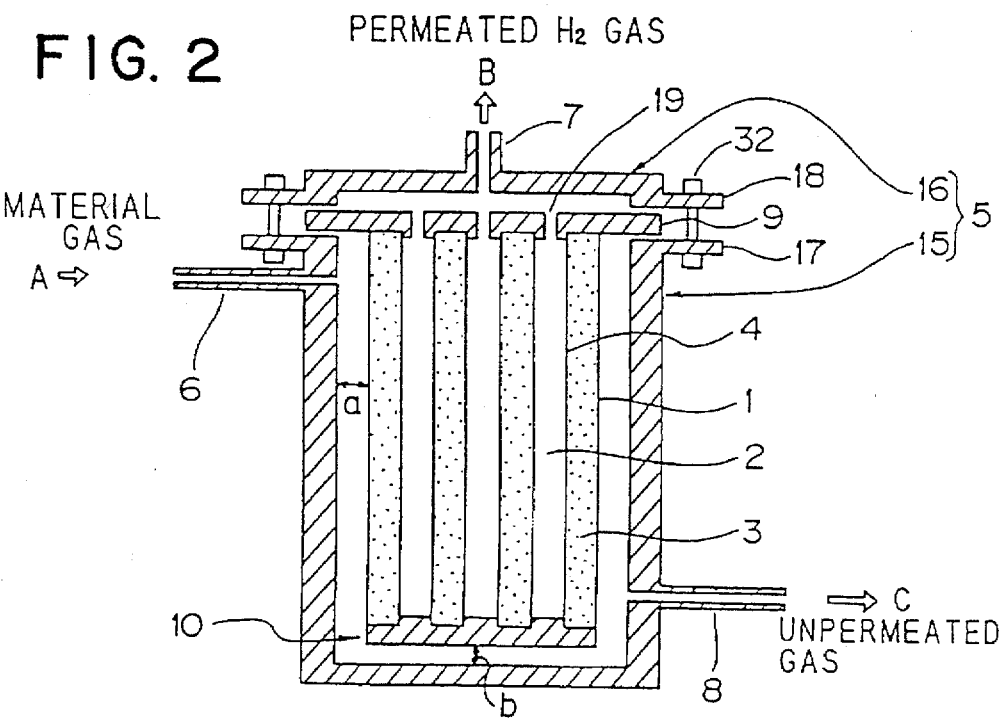
FIG. 2 is a schematic view showing another embodiment of the hydrogen preparing apparatus regarding the present invention.
Figure 3:
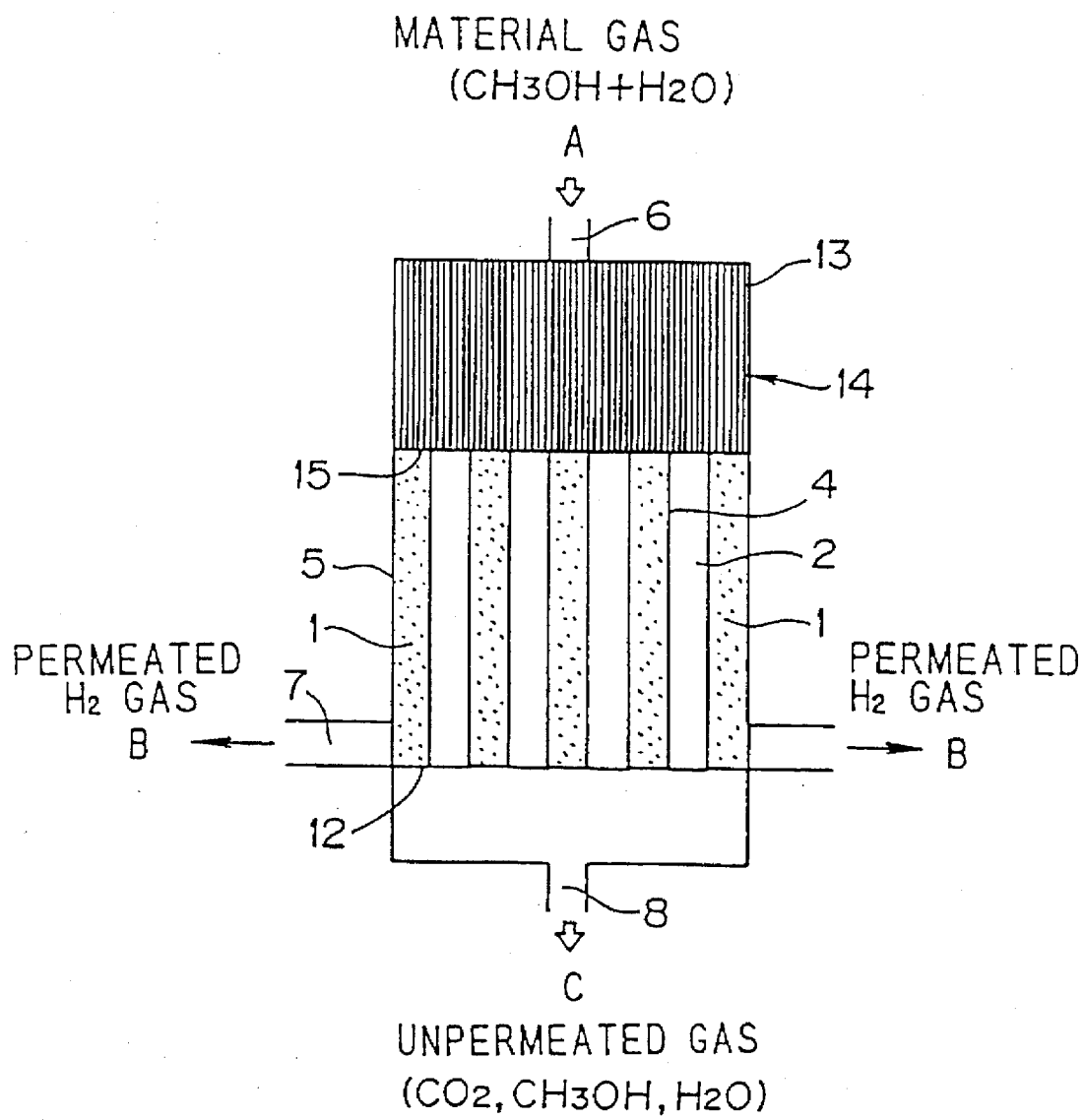
FIG. 3 is a schematic view showing still another embodiment of the hydrogen preparing apparatus regarding the present invention.
Figure 4:
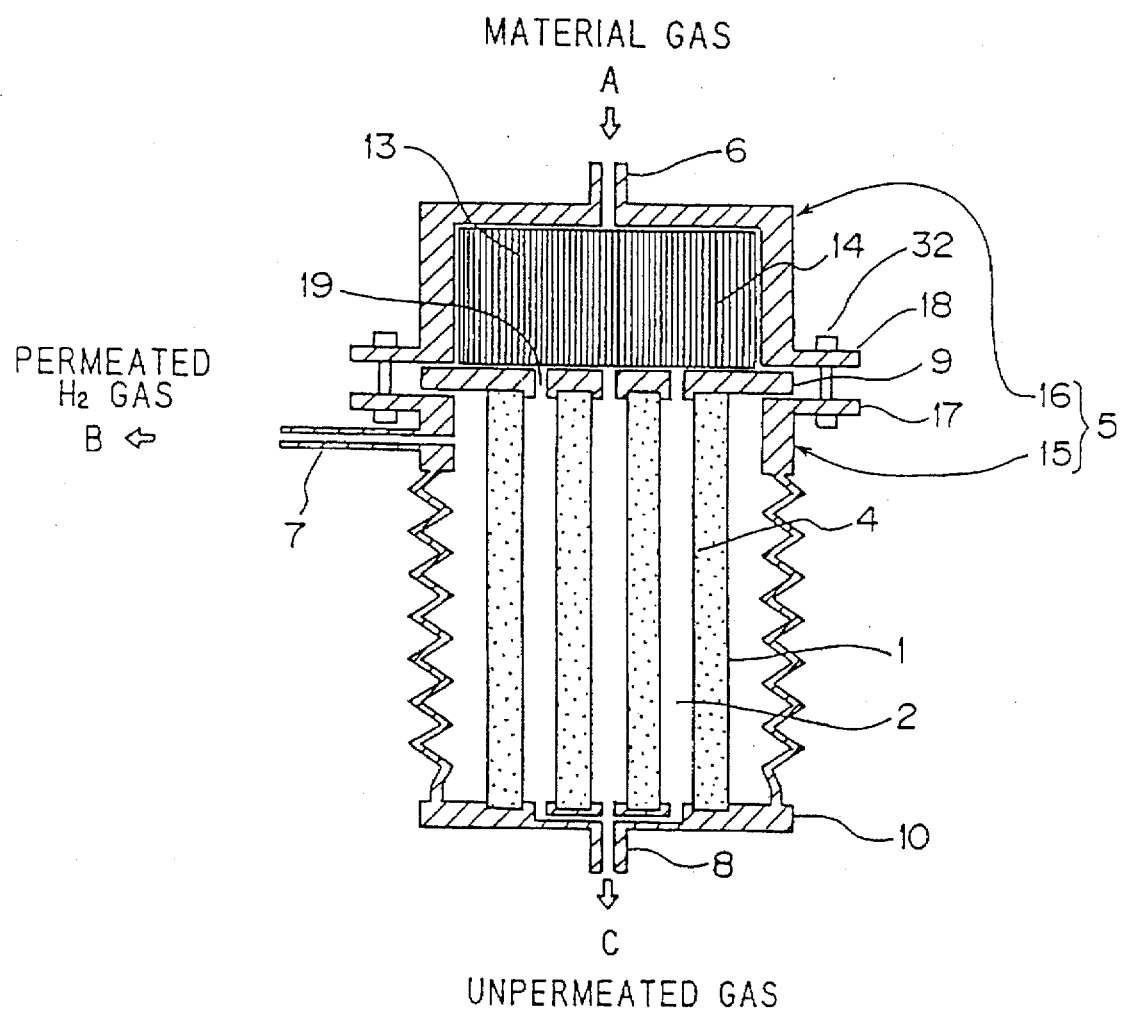
FIG. 4 is a schematic view showing a further embodiment of the hydrogen preparing apparatus regarding the present invention.

FIGS. 2, 3 and 4 are schematic views showing other embodiments of the hydrogen preparing apparatus regarding the present invention.

The hydrogen preparing apparatus in FIG. 1 has the structure in which the material gas A is introduced into the reforming catalyst layers 3 through the end surface of the porous substrate 1, but in the hydrogen preparing apparatus shown in FIG. 2, the material gas A is introduced into the reforming catalyst layers 3 through the outer periphery of the porous substrate 1.

In FIG. 2, the porous substrate 1 has a wholly cylindrical shape and is in the state of a monolithic structure in which a plurality of the cylindrical through-holes 2 are formed, as in the case of FIG. 1. In the pores of the substrate 1, a steam reforming catalyst of Cu or the like for the hydrocarbon is supported, thereby forming reforming catalyst layers 3.

The container 5 is constituted of a container body 15 and a lid 16, and it has an inlet 6 for the material gas A, an outlet 7 for the separated hydrogen gas B and another outlet 8 for an unpermeated gas C.

The container body 15 is cylindrical and has a bottom, an upper opening, the inlet 6 for the material gas on its outer periphery, and the outlet 8 for the unpermeated gas. In addition, the container body 15 has an outward lug 17 around the outer peripheral edge of the opening.

On the other hand, the lid 16 has a lower opening, the outlet 7 for the separated hydrogen gas B at its central position, and an outward lug 18 around the outer peripheral edge of the opening.

The flanges 9, 10 are made of a ceramic or a metal and have a disc shape, and it is further equipped with a plurality of circular projections having the same diameter as that of the through-holes 2 of the porous substrate 1. The flange 9 has orifices 19 at the centers of the above-mentioned projections. The flanges 9, 10 are stuck and fixed to the end surfaces of the porous substrate 1, with the projections being inserted into the through-holes 2 of the porous substrate 1. For a bond between the flanges 9, 10 and the porous substrate 1, a heat-resistant inorganic bonding agent can be used, and examples of suitable bonding agents include a cement, a mortar and the like having a thermal expansion coefficient similar to that of the flanges 9, 10, and a glass and a brazing material having a transition point of 550° C. or more.

The outer peripheral edge of the flange 9 is airtightly nipped by a gasket or the like and the lugs 17, 18 of the lid 16 and the container body 15, and the peripheral edge is further fastened and fixed by fixing members 32. Furthermore, if necessary, the outer peripheral edge can be fixed by welding.

In this way, one end of the porous substrate 1 is fixed in an overhung state to the container 5 via the flange 9. One end of each of the through-holes 2 is connected to the outlet 7 for the separated hydrogen gas B via the orifices 19 of the flange 9, and the other ends of the through-holes 2 are airtightly sealed by the flange 10.

The material gas A is introduced into the hydrogen preparing apparatus through the inlet 6 and further fed to the reforming catalyst layers 3 of the porous substrate 1. A hydrogen gas component in a reaction gas produced on the reforming catalyst layers 3 selectively permeates through the hydrogen separating films 4, and then flows into the through-holes 2. The separated hydrogen gas B passes through the lid 16 and flows out of the outlet 7. The unpermeated gas C flows out of the outlet 8.

The porous substrate 1 can be supported at only one end in the container 5 to absorb, the difference in thermal expansion between the container 5 and the porous substrate 1 at a high temperature. Furthermore, the diffusion efficiency of the material gas A into the porous substrate 1 can be heightened by arranging the outlet 8 for the unpermeated gas C on the opposite side of the inlet 6 for the material gas A and by decreasing distances a and b between the outer wall of the porous substrate 1 and the inner wall of the container 5. The distances a and b are each preferably in the range of 0.1 to 10 mm. In order to further heighten the diffusion efficiency, the space between the outer wall of the porous substrate 1 and the inner wall of the container 5 can be filled with a ceramic fiber or the like.

The hydrogen preparing apparatus shown in FIG. 3 is different from the apparatuses in FIGS. 1 and 2 in that a reforming catalyst is supported on the surface of a honeycomb carrier 13 arranged on the upstream side of the porous substrate 1 to form reforming catalyst layers 14 instead of supporting the steam reforming catalyst in the pores of the porous substrate 1. In addition, end surfaces 15 of the porous substrate 1 on the side of the outlet 6 for the material gas are sealed with a sealant, so that the outlet 7 for the separated hydrogen gas and the outlet 8 for the unpermeated gas are arranged inversely to the case of FIG. 1.

In the hydrogen preparing apparatus shown in FIG. 3, the material gas A is introduced into the apparatus through the outlet 6 for the material gas, and further fed to the reforming catalyst layers 14 of the honeycomb carrier 13, in which a reaction gas comprising hydrogen, carbon monoxide and carbon dioxide is produced. The thus produced reaction gas is led to the porous substrate 1, and a hydrogen gas alone is separated from the reaction gas via the hydrogen separating films 4 formed on the inner surfaces of the cylindrical through-holes 2. The separated hydrogen gas flows as the permeated hydrogen gas B out of the outlet 7 through the pores of the porous substrate 1. Of the mixed gas of the reaction gas and an unreacted gas, the unpermeated gas C which has not permeated through the hydrogen separating films 4 is discharged from the apparatus through the outlet 8 for the unpermeated gas.

In the hydrogen preparing apparatus shown in FIG. 4, the reforming catalyst is supported on the surface of the honeycomb carrier 13 arranged on the upstream side of the porous substrate 1 to form reforming catalyst layers 14 instead of supporting the steam reforming catalyst in the pores of the porous substrate 1, as shown in FIG. 3. However, the apparatus of FIG. 4 is different from that of FIG. 3 in that the porous substrate 1 is supported in an overhung state via the flange 9 in the container 5 and a cushion means for absorbing the expansion of the porous substrate 1 is provided.

In order to feed the material gas A to the interior of the cylindrical through-holes 2, the material gas is introduced through the ends of the through-holes and the unpermeated gas is discharged through the other ends thereof. Therefore, it is required that a hydrogen separator is supported at one end in the overhung state in the container 15, and the other end of the hydrogen separator is connected to the outlet of the container. Therefore, the hydrogen manufacturing apparatus might be damaged by the difference in thermal expansion between the hydrogen separator and the container. However, the outer periphery of the container body 15 can be constituted in a bellowslike form to absorb the expansion of the porous substrate 1 in its axial direction, whereby the hydrogen manufacturing apparatus can be prevented from being damaged by the difference in thermal expansion between the container 5 and the porous substrate 1. The bellowslike portion suffers the pressure of the permeated gas, but this pressure is low, usually in the range of from negative pressure to 2 kg/cm$^2$ which is lower as compared with the pressure of the material gas, i.e., several kg/cm$^2$ to 10 kg/cm$^2$, and therefore the force which functions to extend the bellows can be ignored.

As another cushion means for absorbing the expansion of the porous substrate 1, there is a means in which the outlet 8 for the unpermeated gas is connected to the through-holes 2 of the porous substrate 1 by a spirally constituted pipe to impart elasticity to the pipe, instead of constituting the outer periphery of the container body 15 in the bellowslike form.

In the hydrogen manufacturing apparatuses shown in FIGS. 3 and 4, the honeycomb carrier 13 in which the reforming catalyst layers 14 are formed and the porous substrate 1 in which the hydrogen separating films 4 are formed can be alternately arranged to reduce the amount of unreacted gas. In this case, of the mixed gas with the unreacted gas discharged through the outlet 8 for the unpermeated gas in FIGS. 3 and 4, the unpermeated gas C which has not permeated through the hydrogen separating films 4 is introduced through the outlet 6 for the material gas again, whereby the conversion of the material methanol into hydrogen can be increased up to 100%.

Figure 5:
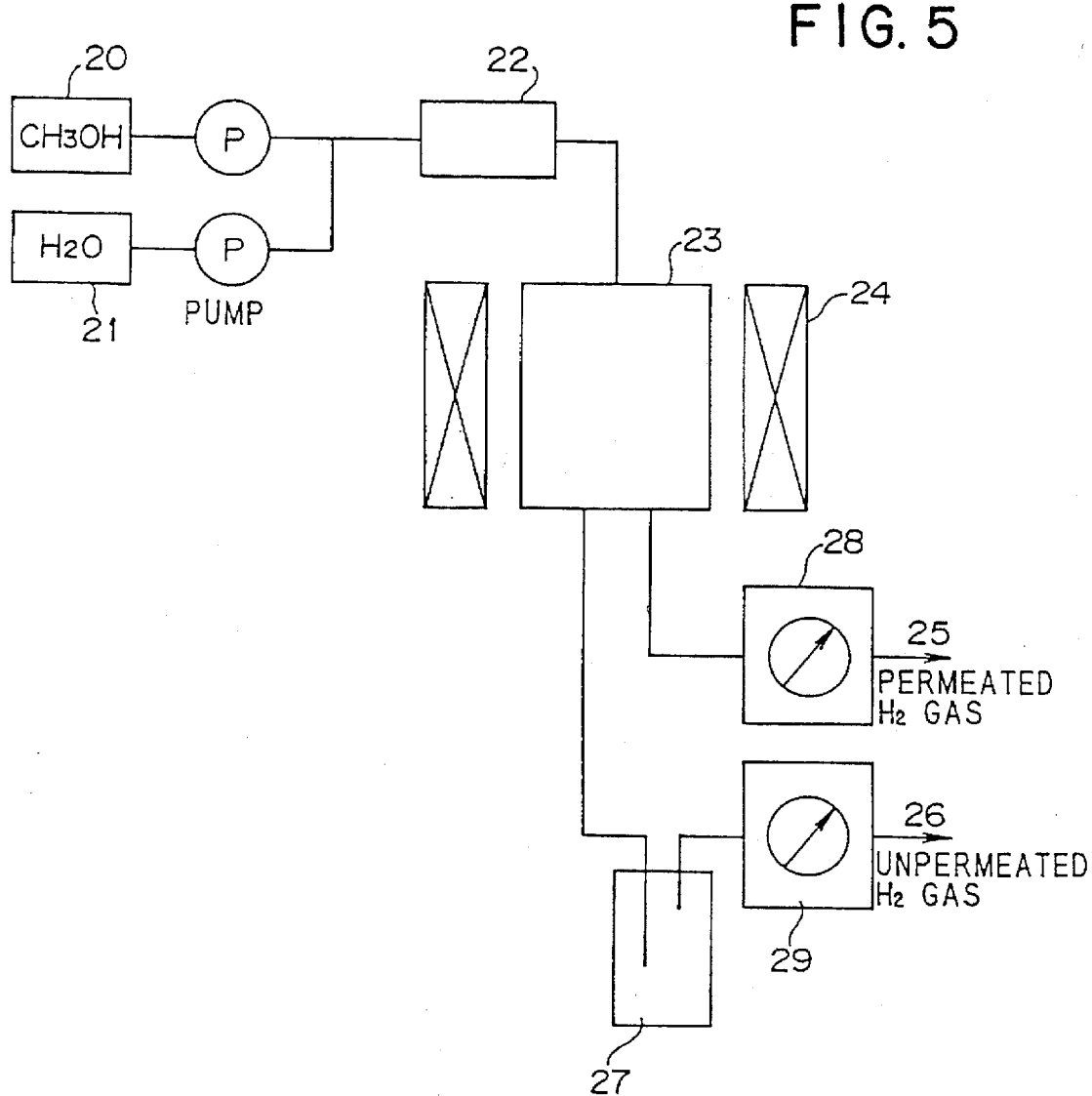
FIG. 5 is one example of a hydrogen preparation flow chart into which the hydrogen preparing apparatus of the present invention is incorporated.

FIG. 5 shows one embodiment of a hydrogen manufacturing flow chart in which the hydrogen preparing apparatus of the present invention is incorporated, and methanol ($CH_3OH$) 20 and water ($H_2O$) 21 are pressurized and mixed by means of pumps P, and then introduced into an evaporator 22, in which they are evaporated. The evaporated methanol 20 and water 21 are then introduced into a hydrogen preparing apparatus (whose typical constitution is shown in FIGS. 1 to 4) 23 heated to a predetermined temperature necessary for a steam reforming reaction by means of a heater 24, and in the apparatus, the steam reforming reaction is carried out to produce a reaction gas comprising hydrogen, carbon monoxide, carbon dioxide and excess steam. Of the reaction gas, a predetermined amount of a hydrogen gas is separated by the hydrogen separating films formed in the hydrogen preparing apparatus 23 and then collected as a permeated gas 25. On the other hand, of the mixed gas of the reaction gas and the unreacted gas, the unpermeated gas which has not permeated through the hydrogen separating films is collected together with the hydrogen gas, carbon monoxide and carbon dioxide by trapping steam as water by a liquid trap means 27. Reference numerals 28 and 29 are flowmeters.

The present invention has been described above with reference to the embodiments, but the scope of the present invention should not be limited to these embodiments.

Figure 6:
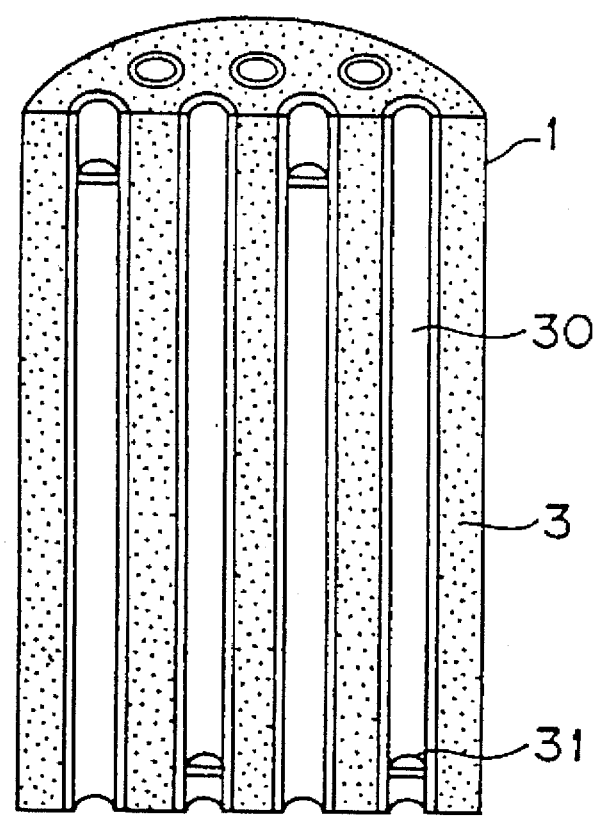
FIG. 6 is a schematic view showing another example of a porous substrate.

For example, the porous substrate 1 having no through-holes is also acceptable, and for example, walls 31 may be formed in the cylindrical spaces 30, as shown in FIG. 6. In addition, the through-holes do not have to be formed in parallel with the axial direction of the porous substrate 1, and hence they may be inclined or curved at a predetermined angle to the axial direction. The number of the through-holes is not limited, either.

The material for the porous substrate 1 must not react with either the hydrogen separating films 4 or the material gas and must have such heat resistance as to withstand a reforming reaction temperature and mechanical strength. Typical examples of preferred materials for the porous substrate 1 include ceramics such as alumina, silica, silica-alumina, mullite, cordierite and zirconia, porous glass, carbon and a metal such as a stainless steel (SUS).

Similarly, the honeycomb carrier is not restrictive, so long as it has many through-holes divided by partitions. No particular restriction is put on the material of the honeycomb carrier, and the same material as mentioned above can be used.

Next, the present invention will be described in more detail with reference to examples.

EXAMPLE 1

Reference will be made to an example of a hydrogen preparing apparatus constituted as shown in FIG. 1.

A cylindrical monolithic porous substrate 1 made of alumina was used which had an outer diameter of 30 mm and a length of 100 mm and which was provided with 19 cylindrical through-holes 2 having a diameter of 4 mm. The diameter of the pores in the porous substrate 1 is about 10 µm, and on the inner surfaces of the cylindrical through-holes 2, pore layers comprising the fine pores having a diameter of 0.1 µm were formed. Next, the inner surfaces of the cylindrical through-holes 2 were plated with a Pd film having a thickness of 16 µm and an Ag film having a thickness of 4 µm by a chemical plating method. Afterward, a heat treatment was carried out in an Ar atmosphere at 900° C. for 2 hours to form hydrogen separating films 4 comprising an Pd—Ag alloy and having a thickness of 20 µm.

The area of the Pd—Ag hydrogen separating films 4 was 24 $cm^2$, and a mixed gas comprising $H_2$ and $CO_2$ and having a hydrogen concentration of 67% was used as a material gas. In this case, a hydrogen permeation velocity was 27 Nml/$cm^2$.minute at 300° C. under a pressure of 9.5 atm and a permeated hydrogen gas pressure of 1 atm.

Next, Cu which was a steam reforming catalyst was supported in the pores of the porous substrate 1 provided with the hydrogen separating films 4. The catalyst was supported by repeating a process 10 times which comprised immersing the porous substrate 1 in a 20% $Cu(NO_3)_2$ solution, carrying out vacuum deaeration to impregnate the pores of the porous substrate 1 with the solution, taking the porous substrate 1 out of the solution, and then drying the same at 100° C. for 5 hours. Afterward, this porous substrate 1 was calcined at 300° C. for 3 hours to form reforming catalyst layers 3.

In the pores of the thus obtained porous substrate 1, CuO was formed in an amount of about 10% by weight in terms of Cu.

Next, flanges 9, 10 made of SUS were bonded to end surfaces 11, 12 of the porous substrate 1, respectively. This bonding was carried out in Ar by the use of an Au brazing material to airtightly bond the flanges 9, 10 to the hydrogen separating films 4. Afterward, the thus bonded porous substrate 1 was placed in a container 5, and the container 5 was then bonded to the flanges 9, 10 by welding to manufacture a hydrogen preparing apparatus.

The steam reforming reaction of methanol was carried out by the use of this hydrogen preparing apparatus. Prior to the reaction, the activation treatment of the reforming catalyst was done. This activation treatment was accomplished by introducing an Ar gas into the hydrogen preparing apparatus at 1 liter/minute, elevating the temperature up to 300° C., and then adding a hydrogen gas to the Ar gas every 10% at an interval of 20 minutes so that the content of hydrogen might be in the range of 20 to 50%.

After the apparatus had been sufficiently purged with the Ar gas, the introduction of the Ar gas was stopped, and next, methanol and $H_2O$ which were materials were fed thereto at 1.0 g/min and 0.6 g/min, respectively. Reaction was carried out under a material gas pressure of 9.5 atm and a permeated hydrogen gas pressure of 1 atm. As a result, the permeated hydrogen gas could be obtained at 600 ml/min. Furthermore, the conversion of methanol calculated by dividing the sum of mols of produced carbon monoxide and carbon dioxide by moles of fed methanol was 98%.

EXAMPLE 2

Reference will be made to an example of a hydrogen preparing apparatus constituted as shown in FIG. 3.

A honeycomb carrier made of cordierite and having 700 cells of 1 mm×1 mm and having an outer diameter of 30 mm and a length of 100 mm was used, and on the surface of this honeycomb carrier, reforming catalyst layers 14 were formed. The formation of the reforming catalyst layers 14 were accomplished by immersing the honeycomb cordierite in an alumina sol, calcining the same to form alumina particles on the surface of the honeycomb carrier, and then supporting a Cu catalyst thereon as in Example 1.

On the downstream side of the thus prepared honeycomb reforming catalyst layers 14, there was installed a porous substrate 1 provided with hydrogen separating films 4 having the same constitution as in Example 1, thereby manufacturing a hydrogen preparing apparatus. Next, the steam reforming of methanol was carried out.

As a result, a hydrogen gas was obtained at 600 ml/min, and the conversion of methanol in this reaction was 98%.

COMPARATIVE EXAMPLE

As in Example 1, a cylindrical monolithic porous substrate 1 was used which had an outer diameter of 30 mm and a length of 100 mm and which was provided with 19 cylindrical through-holes 2 having a diameter of 4 mm. Afterward, the inner surfaces of the cylindrical through-holes having a diameter of 4 mm were provided with hydrogen separating films comprising Pd—Ag and having a thickness of 20 μm by a chemical plating method.

The outside of the porous substrate was filled with 202 g of a commercially available reforming catalyst (trade name Guardler G-66B) to manufacture a hydrogen preparing apparatus, and reforming reaction was then carried out as in Example 1. At this time, the volume of the catalyst was 175 ml, as calculated from a filling density.

As a result of the reforming reaction, a hydrogen gas was obtained at 600 ml/min, and the conversion of methanol was 98%, as in Example 1.

According to the above-mentioned results, the volume of a reforming reactor portion was 71 ml in Example 1, and it was 142 ml in Example 2, whereas it was 246 ml in Comparative Example. In consequence, it has been confirmed that the hydrogen preparing apparatus of the present invention can be miniaturized.

As described above, according to the hydrogen preparing apparatus of the present invention, a reforming catalyst is supported in the pores of a porous substrate or on the surface of a honeycomb carrier, and therefore the surface area of the catalyst per unit volume of the apparatus can be increased, whereby a reaction apparatus can be miniaturized. Furthermore, the porous substrate can be formed into a monolithic structure having through-holes, and hydrogen separating films can be formed on the inner surfaces of the through-holes which extend through the porous substrate, whereby the area of the hydrogen separating films per unit area of the porous substrate can be increased, with the result that the hydrogen separating efficiency can be improved. In addition, the porous substrate can be supported in an overhung state, and in certain cases, a cushion means can be provided to absorb the extension of the porous substrate owing to its thermal expansion, whereby the hydrogen preparing apparatus can be prevented from being damaged by a difference in thermal expansion between the porous substrate and a container.

What is claimed is:

1. A hydrogen preparing apparatus which reforms a hydrocarbon and/or a hydrocarbon containing an oxygen atom to obtain a hydrogen-containing gas and separates hydrogen from this hydrogen-containing gas, said apparatus comprising
a porous substrate,
a hydrogen separating film which is formed on a predetermined surface portion of the porous substrate and which selectively separates hydrogen, and
a reforming catalyst for reforming the hydrocarbon, supported in the pores of the porous substrate.

2. The hydrogen preparing apparatus according to claim 1 wherein the porous substrate is a monolithic structure having through-holes.

3. The hydrogen preparing apparatus according to claim 1 wherein the hydrogen separating films are formed on the inner surfaces of the through-holes which extend through the porous substrate.

4. The hydrogen preparing apparatus according to claim 2 wherein the hydrogen separating films are formed on the inner surfaces of the through-holes which extend through the porous substrate.

* * * * *